United States Patent
Bijl et al.

(10) Patent No.: US 10,807,042 B2
(45) Date of Patent: *Oct. 20, 2020

(54) MOISTURE SWING CARBON DIOXIDE ENRICHMENT PROCESS

(71) Applicant: CLIMEWORKS AG, Zurich (CH)

(72) Inventors: Antonie Bijl, Enschede (NL); Timo Roestenberg, Schalkhaar (NL); Rafael Rodriguez Mosqueda, Enschede (NL); Gerrit Brem, Wapenveld (NL); Paul O'Connor, Hoevelaken (NL)

(73) Assignee: CLIMEWORKS AG, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,502

(22) Filed: Jun. 12, 2019

(65) Prior Publication Data

US 2019/0314762 A1 Oct. 17, 2019

Related U.S. Application Data

(63) Continuation of application No. 15/101,465, filed as application No. PCT/EP2014/076462 on Dec. 3, 2014, now Pat. No. 10,350,547.

(Continued)

(51) Int. Cl.
*B01D 53/62* (2006.01)
*B01D 53/06* (2006.01)
(Continued)

(52) U.S. Cl.
CPC ............ *B01D 53/96* (2013.01); *A01G 9/18* (2013.01); *B01D 53/0454* (2013.01);
(Continued)

(58) Field of Classification Search
None
See application file for complete search history.

(56) References Cited

U.S. PATENT DOCUMENTS

| 4,344,778 A | 8/1982 | Matsuoka et al. |
| 4,784,672 A | 11/1988 | Sircar |

(Continued)

FOREIGN PATENT DOCUMENTS

| DE | 3415970 A1 | 10/1985 |
| EP | 1074297 A2 | 2/2001 |

(Continued)

OTHER PUBLICATIONS

Lee et al., "The effect of relative humidity on CO2 capture capacity of potassium-based sorbents." Korean J. Chem. Eng., vol. 28, No. 2, pp. 480-486 (2011) (published Feb. 2011).*

(Continued)

*Primary Examiner* — Daniel Berns
(74) *Attorney, Agent, or Firm* — Sughrue Mion, PLLC

(57) ABSTRACT

A process is disclosed for reversibly absorbing carbon dioxide to an alkali metal or earth alkaline absorbent. For absorption the absorbent is contacted with a first gas composition. For desorption the absorbent is contacted with a second gas composition. The moisture contents of the first and second gas compositions are controlled so that during the absorption step the absorbent is converted to a bicarbonate, and during the desorption step the absorbent is converted to a carbonate hydrate. Compared to prior art processes the process of the invention requires less energy input. The process of the invention is particularly suitable for producing a carbon dioxide enriched gas for accelerating plant growth in a greenhouse.

15 Claims, 6 Drawing Sheets

Related U.S. Application Data

(60) Provisional application No. 61/910,977, filed on Dec. 3, 2013.

(51) Int. Cl.

| | | |
|---|---|---|
| *B01D 53/10* | (2006.01) | |
| *B01D 53/81* | (2006.01) | |
| *B01D 53/82* | (2006.01) | |
| *B01D 53/83* | (2006.01) | |
| *B01D 53/96* | (2006.01) | |
| *B01D 53/04* | (2006.01) | |
| *B01D 53/14* | (2006.01) | |
| *A01G 9/18* | (2006.01) | |
| *B01J 20/04* | (2006.01) | |
| *B01J 20/28* | (2006.01) | |
| *B01D 53/08* | (2006.01) | |

(52) U.S. Cl.
CPC ......... *B01D 53/0462* (2013.01); *B01D 53/62* (2013.01); *B01D 53/82* (2013.01); *B01J 20/043* (2013.01); *B01J 20/28045* (2013.01); *B01D 53/08* (2013.01); *B01D 2251/30* (2013.01); *B01D 2251/306* (2013.01); *B01D 2251/40* (2013.01); *B01D 2251/606* (2013.01); *B01D 2253/112* (2013.01); *B01D 2253/1122* (2013.01); *B01D 2257/504* (2013.01); *B01D 2259/4009* (2013.01); *B01D 2259/40056* (2013.01); *Y02A 50/2342* (2018.01); *Y02C 10/04* (2013.01); *Y02C 10/08* (2013.01); *Y02P 60/24* (2015.11)

(56) References Cited

U.S. PATENT DOCUMENTS

| | | | |
|---|---|---|---|
| 6,387,337 | B1 | 5/2002 | Pennline |
| 10,350,547 | B2 * | 7/2019 | Bijl .................. B01J 20/28045 |
| 2004/0107832 | A1 | 6/2004 | Tongue et al. |
| 2007/0051238 | A1 | 3/2007 | Jain et al. |
| 2010/0092382 | A1 | 4/2010 | Stewart et al. |
| 2010/0251887 | A1 | 10/2010 | Jain |
| 2012/0160099 | A1 | 6/2012 | Shoji |
| 2013/0004394 | A1 | 1/2013 | Fan |
| 2013/0142718 | A1 | 6/2013 | Fan et al. |

FOREIGN PATENT DOCUMENTS

| | | |
|---|---|---|
| EP | 1510243 A1 | 3/2005 |
| EP | 2638953 A2 | 9/2013 |
| EP | 3077080 B1 | 2/2019 |
| WO | 2011/090438 A1 | 7/2011 |
| WO | 2014/012966 A1 | 1/2014 |
| WO | 2015/082567 A1 | 6/2015 |

OTHER PUBLICATIONS

International Search Report for PCT/EP2013/065074 dated Apr. 11, 2013.

International Preliminary Report on Patentability for PCT/EP2013/065074 dated Mar. 11, 2014.

International Search Report for PCT/EP2014/076462 dated Feb. 27, 2015.

Duan, Y. Ab Initio Thermodynamic Study of the CO2 Capture Properties of Potassium Carbonate Sesquihydrate K2CO3.1.5H2O. The Journal of Physical Chemistry, 2012, pp. 14461-14470.

\* cited by examiner

MOISTURE SWING CARBON DIOXIDE ENRICHMENT PROCESS

BACKGROUND OF THE INVENTION

1. Field of the Invention

The invention relates generally to an absorption/desorption process for increasing the carbon dioxide concentration of a carbon dioxide-containing gas, and more specifically to an absorption/desorption process comprising a moisture swing.

2. Description of the Related Art

Our co-pending patent application PCT/EP 2013/065074, incorporated herein by reference, describes a temperature swing process for producing a gas having relatively high carbon dioxide concentration. The process comprises heating of large volumes of gas, which requires significant amounts of energy.

Thus, there is a need for an improved swing absorption/desorption process for producing carbon dioxide rich gases.

BRIEF SUMMARY OF THE INVENTION

The present invention addresses these problems by providing a process for reversibly absorbing $CO_2$ to an alkali or earth alkaline metal absorbent, said process comprising a $CO_2$ absorption step wherein the alkali or earth alkaline metal absorbent is contacted with a first gas composition; and a $CO_2$ desorption step wherein the alkali or earth alkaline metal absorbent is contacted with a second gas composition, and the respective moisture contents of the first and second gas compositions are controlled such that during the absorption step the alkali or earth alkaline metal absorbent is converted to a bicarbonate, and during the desorption step the alkali or earth alkaline metal absorbent is converted to a carbonate hydrate.

The process is particularly suitable for providing carbon dioxide to a greenhouse, to promote plant growth.

DETAILED DESCRIPTION OF THE INVENTION

Figure 1:
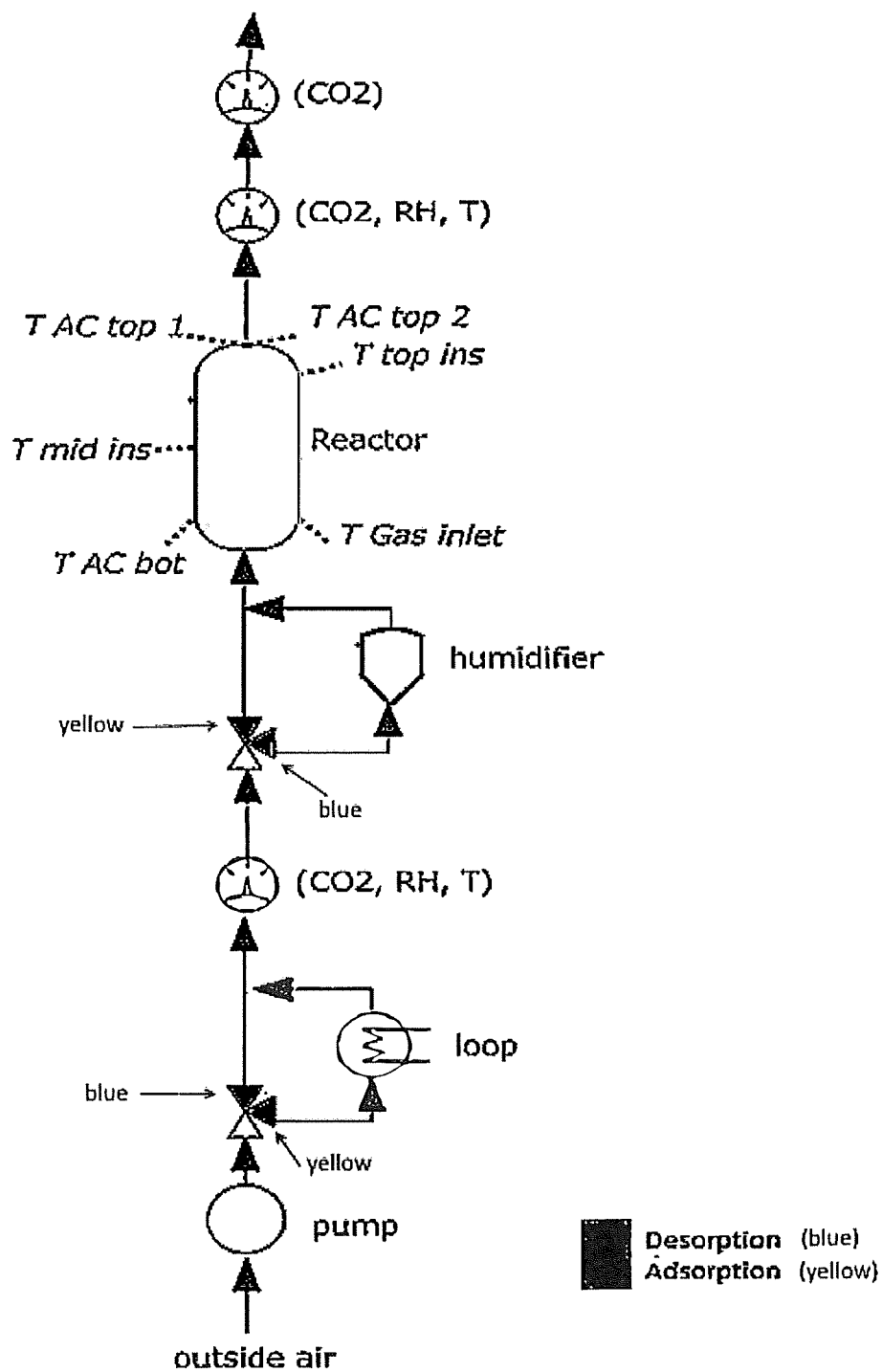
FIG. 1 is a schematic representation of an apparatus for carrying out the process of the invention.

The following is a detailed description of the invention.

Definitions

The term "sesquihydrate" as used herein means a salt, such as a carbonate, having 1.5 mole of crystal water per mole of salt.

In its broadest aspect the present invention relates to process for reversibly absorbing $CO_2$ to an alkali or earth alkaline metal absorbent said process comprising a $CO_2$ absorption step wherein the alkali or earth alkaline metal absorbent is contacted with a first gas composition; and a $CO_2$ desorption step wherein the alkali or earth alkaline metal absorbent is contacted with a second gas composition, and the respective moisture contents of the first and second gas compositions are controlled such that during the absorption step the alkali or earth alkaline metal absorbent is converted to a bicarbonate, and during the desorption step the alkali or earth alkaline metal absorbent is converted to a carbonate hydrate.

The absorbent can be any alkali metal or alkaline earth metal carbonate, in particular sodium carbonate or potassium carbonate, potassium carbonate being particularly preferred. The invention will be described in more detail with reference to potassium carbonate as the absorbent, but it will be understood that the invention is not limited in any way to the use of this absorbent.

The absorption reaction can be written as:

$$K_2CO_3 + CO_2 + H_2O \rightarrow 2KHCO_3 \tag{1}$$

and the desorption reaction as:

$$2KHCO_3 \rightarrow K_2CO_3 + CO_2 + H_2O \tag{2}$$

Absorption reaction (1) is exothermic ($\Delta H=-141$ kJ/mole), while desorption reaction (2) is endothermic ($\Delta H=+141$ kJ/mole). Two observations can be made. Firstly, the desorption reaction requires a large energy input. Secondly, the absorption step is favored by the presence of moisture, whereas the desorption step is favored by using a flush gas that is as dry as possible.

Studies by Duan et al. (see Duan, Y. et.al. (2012). Ab Initio Thermodynamic Study of the CO2 Capture Properties of Potassium Carbonate Sesquihydrate K2CO3.1.5H2O. The Journal of Physical Chemistry, 14461-14470) suggest a pathway through an intermediate species, namely potassium carbonate sesquihydrate, $K_2CO_3.1.5H_2O$. Thus, reaction (1) can be written as two consecutive reactions:

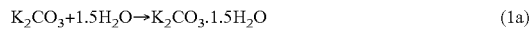
$$K_2CO_3 + 1.5H_2O \rightarrow K_2CO_3.1.5H_2O \tag{1a}$$

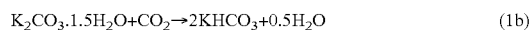
$$K_2CO_3.1.5H_2O + CO_2 \rightarrow 2KHCO_3 + 0.5H_2O \tag{1b}$$

Reaction (2) can be written as:

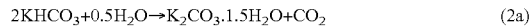
$$2KHCO_3 + 0.5H_2O \rightarrow K_2CO_3.1.5H_2O + CO_2 \tag{2a}$$

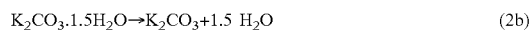
$$K_2CO_3.1.5H_2O \rightarrow K_2CO_3 + 1.5\ H_2O \tag{2b}$$

Reactions (1a) and (1b) are exothermic ($\Delta H=-100$ kJ/mole and $-40$ kJ/mole, respectively). The converse reactions are of course endothermic, $\Delta H$ being $+40$ kJ/mole for reaction (2a) and $+100$ kJ/mole for reaction (2b).

It has now been discovered that an adsorption/desorption swing process can be operated such that the carbonate hydrate is the starting point of the absorption reaction, instead of being a reaction intermediary. Put differently, the absorption/desorption swing process uses the reaction pair (1b)/(2a), instead of reaction pair (1)/(2). This is accomplished by controlling the moisture contents of the absorption gas and the desorption gas.

Several observations need to be made. Firstly, the absorption reaction (1b) produces water, and is therefore favored by using an absorption gas having relatively low moisture content. Secondly, the desorption reaction (2a) consumes water, and is therefore favored by using a desorption gas that has relatively high moisture content. Thirdly, the reaction heat for desorption reaction (2a) requires an energy input of 40 kJ/mole, compared to 141 kJ/mole for reaction (2).

The process of the invention is particularly suitable for absorbing carbon dioxide from ambient air. The absorbing gas preferably has a water vapor pressure of between 0.001 bar and 0.0150 bar, with water vapor pressures in the low end of this range being preferred. It may be desirable to subject the absorbing gas to a drying step, for example by passing a flow of the absorbing gas through a bed of a desiccant or a dry zeolite. In many cases the extra energy cost of the drying step is more than offset by greater absorption efficiency.

During the desorption step care must be taken not to remove crystal water from the carbonate material. Put differently, reaction (2b) must be avoided. For this reason the desorbing gas preferably has a water vapor pressure from 0.020 bar to 0.2 bar. As the first, or absorbing, gas and the second, or desorbing, gas have different moisture contents, the process can be referred to as a moisture swing absorption/desorption process.

It is advantageous to combine the moisture swing with a modest temperature swing. For example, the temperature of the first gas may be in the range of from 250K to 300K, and the temperature of the second gas may be in the range of from 300K to 400K.

In a highly preferred embodiment the first gas composition is ambient air, which is optionally dried, and the second gas composition is obtained from a greenhouse, or ambient air that has been heated and moisturized. Generally, the atmosphere in a greenhouse is relatively humid, which makes it particularly suitable for use as the desorbing gas. Optionally additional moisture may be added to this gas before its use as the desorbing gas. The gas composition obtained from the greenhouse may optionally be heated prior to contacting the absorbent.

Likewise, ambient air may optionally be dried prior to contacting the absorbent in the absorption step. The air may also be subjected to a cooling step.

In this embodiment the second gas composition, after having been contacted with the absorbent, is enriched with carbon dioxide. This carbon dioxide-enriched gas composition is particularly suitable for plant growth (warm, humid air enriched in $CO_2$). It may be piped into the greenhouse to accelerate plant growth.

DESCRIPTION OF ILLUSTRATIVE EMBODIMENTS/EXAMPLES

The following is a description of certain embodiments of the invention, given by way of example only.

FIG. 1 shows a system for carrying out $CO_2$ capture from air at low temperatures through Relative Humidity Swing. The system was provided with two three-way valves. The positions of the valves during adsorption are shown in yellow. The positions of the valves during desorption are shown in blue.

The sorbent was formed by $K_2CO_3 \cdot 1.5H_2O$ supported on the surface of an Active Carbon (AC) honeycomb element, which acted as a thermodynamic carrier. No external heating was provided during the whole $CO_2$ capture/release cycle.

Preparation of the Element

Dimensions of the honeycomb monolith: 10*5*5 cm. The AC honeycomb monolith was immersed in a 2:1 (mass ratio) $K_2CO_3$ solution during approximately 2 seconds. Then the element was dried in a furnace for 8 hours at 100° C. in air. After this treatment the monolith's surface was loaded with a mixture of $K_2CO_3$ and $K_2CO_3 \cdot 1.5H_2O$ salts, which act as $CO_2$ captors according to the chemical reactions (1) and (1b) above.

The water adsorption of AC occurs parallel to these processes. The $\Delta H$ of the water adsorption reaction can be approximated as the negative of the heat of vaporization of water:

$$H_2O_{(vap)} \rightarrow H_2O_{(ads)} \quad \Delta H = -45 \text{ KJ/mol at } 25° \text{ C.} \qquad [3]$$

Initially the reactor was fed with outside air (without any treatment) so $CO_2$ adsorption occurred via carbonation of the two salts, leading to the formation of $KHCO_3$. In the next stage the feeding air (untreated outside air) was pre-humidified by circulating it through a humidifier, increasing its water vapor content. The humidified air was fed to the reactor, so the $KHCO_3$ decomposition (via reaction 2a) occurred. The 40.67 KJ/mol energy requirement was supplied by the adsorption of water vapor in the AC structure (reaction [3]).

In FIG. 1,
"CO2" is the gas CO2 concentration,
"RH" stands for gas relative humidity,
"T" for gas temperature. 2/2
Further, the dotted lines on the reactor indicate temperature measurements, where
"T AC bot" is the temperature of the active carbon at the bottom of the reactor,
"T mid ins" stands for the temperature of the insulation in the middle of the reactor,
"T AC top 1" stands for the a temperature measurement of the active carbon at the top at the outlet of the reactor,
"T AC top 2" stands for another temperature measurement of the active carbon at the top at the outlet of the reactor and
"T top ins" for the temperature of the insulation at the top of the reactor.

Figure 2:
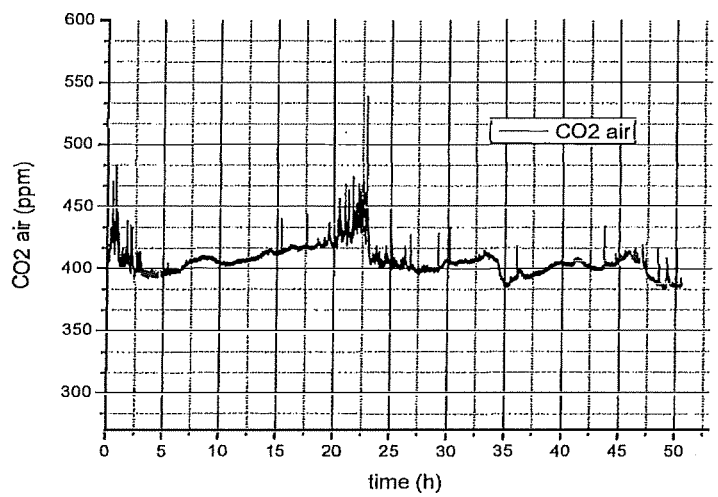
FIG. 2 is a graphical representation of the carbon dioxide concentration of ambient air as a function of time.
Figure 3:
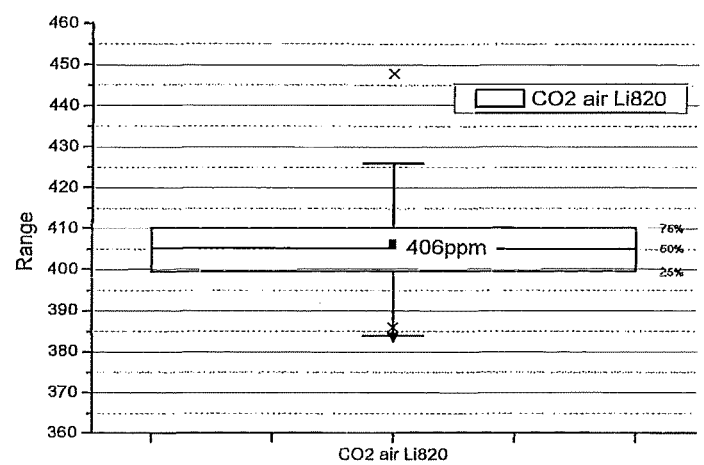
FIG. 3 represents the average carbon dioxide concentration of ambient air as measured in FIG. 2.

Experiments $CO_2$ background level.
$CO_2$ concentration in air was measured for two days. The results are shown in FIG. 2. The average $CO_2$ concentration in air was 406 ppm (see FIG. 3).

Experimental Conditions

The $CO_2$ adsorption was performed during night time when the T of the outside air is lower than during the day. Desorption of $CO_2$ was performed during day time. Air flow at the reactor inlet was 6.667 liters per minute; air flow at the reactor outlet was 6.333 liter per minute.

Table 1 shows the amount of salt present on the AC monolith. The molecular weight of dry potassium carbonate is 138.18; the molecular weight of the sesquihydrate is 165.18. For the calculation it was assumed that after the first adsorption/desorption cycle all salt was present as the sesquihydrate.

TABLE 1

| SALT | PM (G/MOL) | N LOADED (MOL) | N CO$_2$ ADS (MOL) | M CO$_2$ (G) |
|---|---|---|---|---|
| DRY | 138.18 | 0.086047 | 0.086047 | 3.786076 |
| SESQUI | 165.18 | 0.071982 | 0.071982 | 3.167212 |

Figure 4:
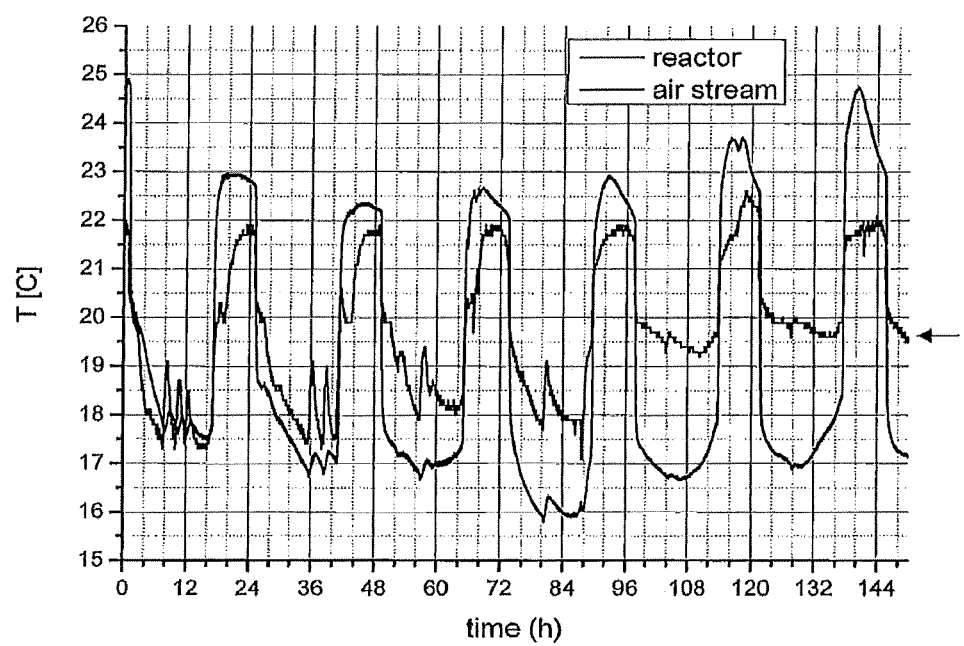
FIG. 4 is a graphic representation of the temperature of the air flow through the reactor of FIG. 1.

The behavior of the temperature T of the air fed to and inside the reactor are plotted in FIG. 4. T in the reactor is lower than the air fed during the adsorption mode because of the endothermic character of the process (water desorption from AC). In the CO2 desorption mode, the T of the reactor is higher than the air stream due to the exothermic character of the process (water adsorption onto AC). The T of the air stream varies from adsorption to desorption modes because of the bypassing of the loop during CO2 desorption mode, i.e. the heat provided by the pump is not transferred (see FIG. 1).

Figure 5:
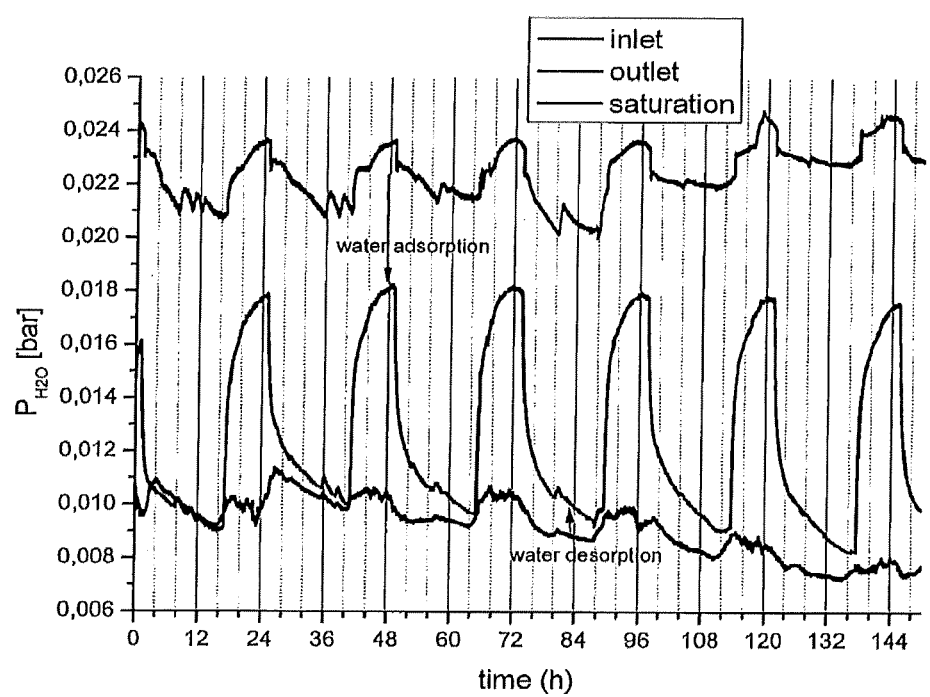
FIG. 5 is a graphic representation of the water vapor pressure of the air flow through the reactor of FIG. 1.

FIG. 5 shows the water vapor content of the air fed to the reactor and obtained from the reactor during the cycles. The inlet and outlet lines represent the $P_{H2O}$ in the air stream at the inlet and outlet of the reactor, with the proviso that the water vapor pressure for the inlet during desorption was measured upstream of the humidifier. The Saturation line represents the saturation water vapor pressure, which is the expected value at the inlet during desorption modes as the air stream is bubbling through the water reservoir (humidifier), reaching a 100% RH.

Figure 6:
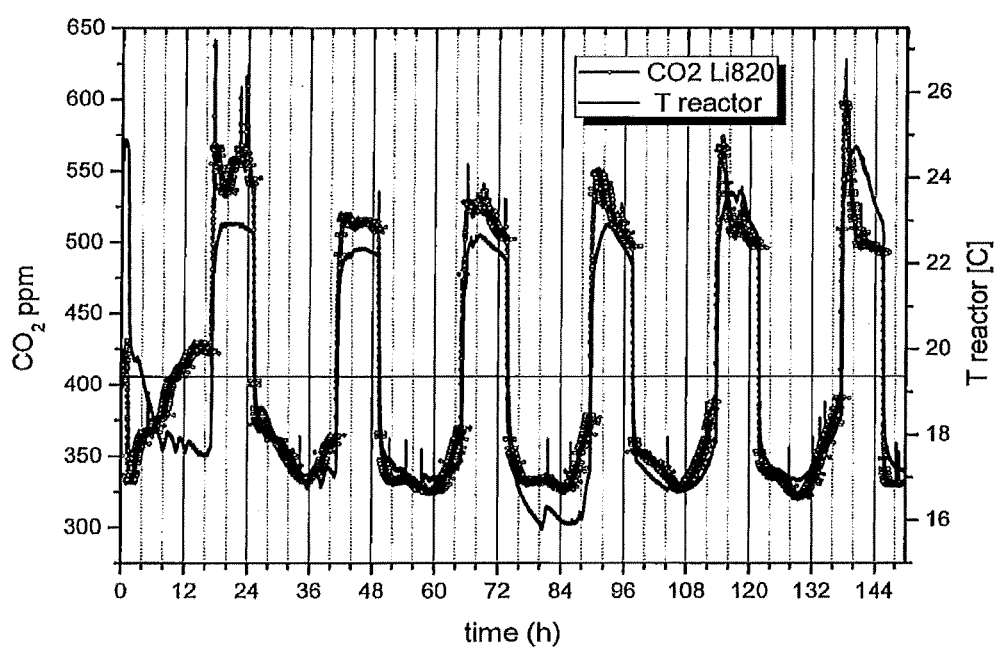
FIG. 6 is a graphic representation of the carbon dioxide concentration of the air flow.

FIG. 6 shows the $CO_2$ adsorption-desorption cycles plotting $[CO_2]$ in ppm (mol/mol) at the outlet of the reactor and $P_{H2O}$ [bar], also at the outlet of the reactor, vs time [h]. The red horizontal line represents the average $[CO_2]$ background value of 406 ppm.

Figure 7:
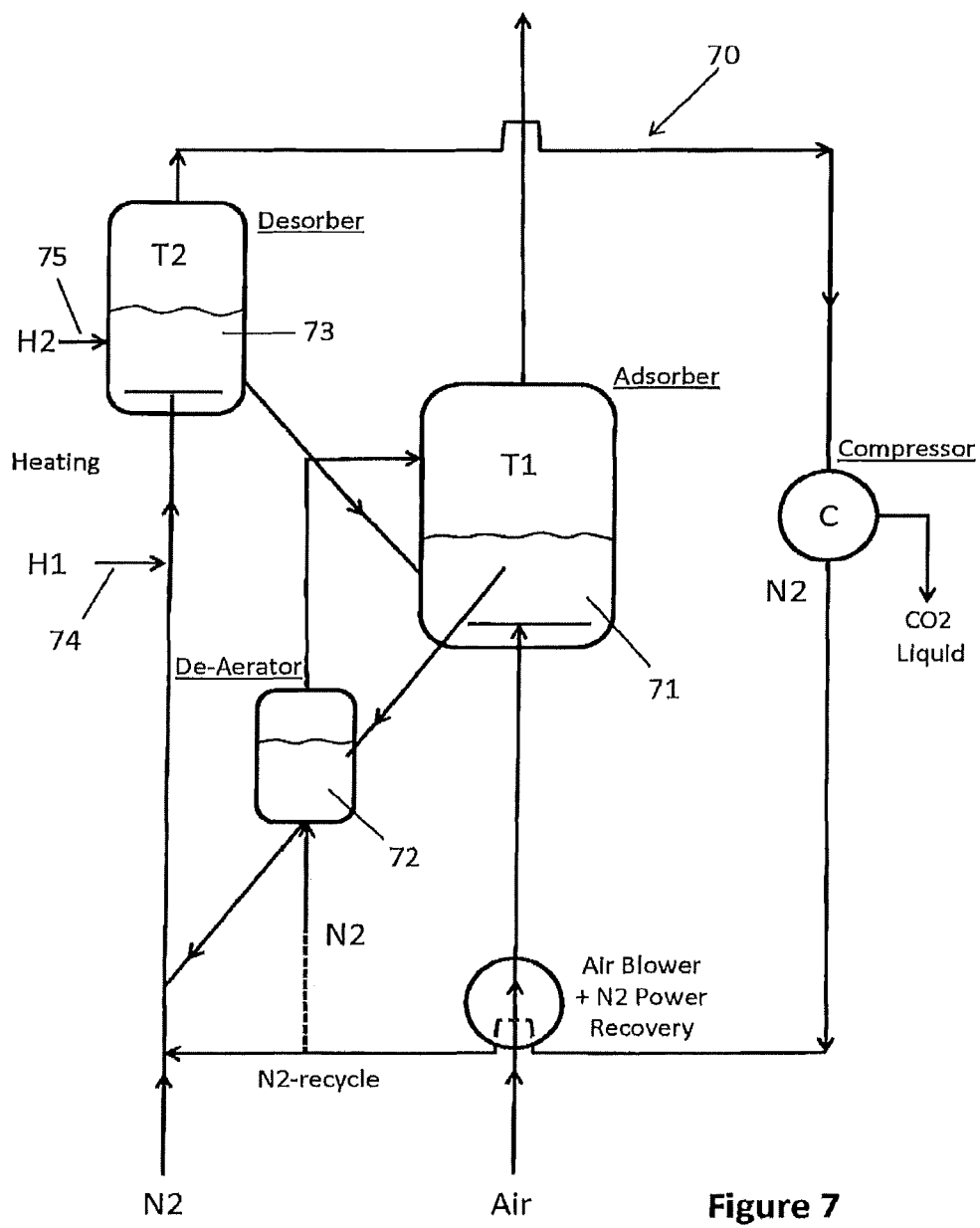
FIG. 7 is a schematic representation of an alternate embodiment of the apparatus for carrying out the process of the invention.

FIG. 7 shows an alternate embodiment of the present invention. In this embodiment the sorbent is a granulated, pelleted or powdered porous carrier with deposited thereupon the $CO_2$ adsorbing salt, referred to as the adsorbing material. FIG. 7 shows an adsorption/desorption system 70. The adsorbing material is circulated continuously from adsorption zone 71, via a de-aeration zone 72, to a desorption zone 73. In adsorber 71 the adsorbent is contacted with the gas from which $CO_2$ is to be adsorbed. This can be air, optionally dried and cooled to aid $CO_2$ adsorption, or flue gas, optionally dried and cooled, or any other gas stream containing $CO_2$. Alternatively, the sorbent material can be mixed with a mild desiccant or a dry zeolite to shift the equilibrium, during adsorption to lower final $CO_2$ concentrations in the contacting gas by simultaneously adsorbing the moisture released during adsorption via reaction 1b.

In de-aerator 72, the gas from which $CO_2$ was to be adsorbed that is entrained with the saturated adsorbent is displaced with a gas that is more suitable for the downstream process. For some applications, oxygen in the downstream gas may be undesirable, (such as CCS (Carbon Capture and Storage and CCU (Carbon Capture and Utilization)), and the sorbent may be de-aerated with, for example, nitrogen. For other applications, such as greenhouses, the de-aeration step may be omitted.

In desorber 73 the sorbent is contacted with a heated gas, optionally with added moisture to aid desorption. In the desorber, the sorbent is regenerated via reaction 2a, and, if present, the desiccant or zeolite is also regenerated. The moisture released by the regeneration of the desiccant or zeolite helps shift reaction 2a to further desorb $CO_2$. The heat supplied for desorption is indicated as input flows 74 of heat H1 and 75 of heat H2. The adsorption temperature T1 in adsorber 71 is lower than desorption temperature T2 in desorber 73. For example, T1 may be in the range from 250K to 300K and temperature T2 may be in the range from 300K to 400K.

In the example of FIG. 7, the nitrogen that is used as a heat carrier and a carrier gas to move $CO_2$ from the sorbent during the desorption is recycled, and $CO_2$ is separated from this gas by utilizing their different saturation pressures, and liquefying the $CO_2$ out of the carrier gas stream by compression. The energy spent for compression of the carrier gas is then (partly) recovered, the condensation heat of the $CO_2$ may also be (partly) utilized as heat source for the desorption step. This mode of operation is particularly suitable for CCS and CCU applications.

Thus, the invention has been described by reference to certain embodiments discussed above. It will be recognized that these embodiments are susceptible to various modifications and alternative forms well known to those of skill in the art.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A process for reversibly absorbing $CO_2$ to an alkali or earth alkaline metal absorbent, said process comprising:
   a $CO_2$ absorption step wherein the alkali or earth alkaline metal absorbent is contacted with a first gas composition; and
   a $CO_2$ desorption step wherein the alkali or earth alkaline metal absorbent is contacted with a second gas composition,
   wherein the respective moisture contents of the first and second gas compositions are controlled such that during the absorption step the alkali or earth alkaline metal absorbent is converted to a bicarbonate, and during the desorption step the alkali or earth alkaline metal absorbent is converted to a carbonate hydrate,
   wherein the first gas composition is optionally dried, and wherein moisture is added to the second gas composition prior to contacting the absorbent.

2. The process of claim 1, wherein the carbonate hydrate is potassium carbonate sesquihydrate.

3. The process of claim 1, wherein the first gas composition is ambient air having a water vapor pressure of between 0.001 bar and 0.0150 bar.

4. The process of claim 1, wherein the first gas composition has a temperature of from 250K to 300K.

5. The process of claim 1, wherein the second gas composition has a water vapor pressure from 0.020 bar to 0.2 bar.

6. The process of claim 1, wherein the second gas composition has a temperature from 300K to 400K.

7. The process of claim 1, wherein the first gas composition is ambient air and is subjected to cooling prior to contacting the absorbent.

8. The process of claim 1, wherein the first composition is ambient air.

9. The process of claim 1, wherein the second gas composition is obtained from a greenhouse.

10. The process of claim 9, wherein the second gas composition is heated prior to contacting the absorbent.

11. The process of claim 1, wherein the absorbent is a sodium or potassium absorbent.

12. The process of claim 11, wherein the carbonate hydrate is potassium carbonate sesquihydrate.

13. The process of claim 11, wherein the absorbent is a potassium absorbent.

14. The process of claim 13, wherein the carbonate hydrate is potassium carbonate sesquihydrate.

15. A process for reversibly absorbing $CO_2$ to an alkali or earth alkaline metal absorbent, said process comprising:
   a $CO_2$ absorption step wherein the alkali or earth alkaline metal absorbent is contacted with a first gas composition; and a CO$_2$ desorption step wherein the alkali or earth alkaline metal absorbent is contacted with a second gas composition, wherein the respective moisture contents of the first and second gas compositions are controlled such that during the absorption step the alkali or earth alkaline metal absorbent is converted to a bicarbonate, and during the desorption step the alkali or earth alkaline metal absorbent is converted to a carbonate hydrate, wherein during the desorption step, crystal water is not removed from the carbonate hydrate, and wherein the second gas composition has a temperature from 300K to 400K.

* * * * *